United States Patent
Laliberte (10) Patent No.: US 11,236,893 B2
(45) Date of Patent: **\*Feb. 1, 2022**

(54) WORK LIGHT HAVING JOBSITE SECURITY FEATURES

(71) Applicant: Robert Bosch GmbH, Stuttgart (DE)

(72) Inventor: Eric R. Laliberte, Naperville, IL (US)

(73) Assignee: Robert Bosch GmbH, Stuttgart (DE)

( \* ) Notice: Subject to any disclaimer, the term of this patent is extended or adjusted under 35 U.S.C. 154(b) by 0 days.

This patent is subject to a terminal disclaimer.

(21) Appl. No.: 16/840,683

(22) Filed: Apr. 6, 2020

(65) Prior Publication Data

US 2021/0310642 A1 Oct. 7, 2021

(51) Int. Cl.
| | |
|---|---|
| H05B 47/10 | (2020.01) |
| F21V 21/14 | (2006.01) |
| F21V 21/26 | (2006.01) |
| F21V 33/00 | (2006.01) |
| H05B 47/115 | (2020.01) |
| H05B 47/125 | (2020.01) |

(Continued)

(52) U.S. Cl.
CPC ............ *F21V 21/145* (2013.01); *F21V 21/26* (2013.01); *F21V 33/0052* (2013.01); *H05B 47/10* (2020.01); *H05B 47/115* (2020.01); *H05B 47/125* (2020.01); *H05B 47/19* (2020.01); *F21W 2131/1005* (2013.01)

(58) Field of Classification Search
CPC .. H05B 47/105; H05B 47/115; H05B 47/125; H05B 47/10; H05B 47/11; H05B 47/19; F21V 21/145; F21V 21/26; F21V 23/0471; F21V 23/0478; F21V 23/045; F21V 23/003; G08B 19/005; G08B 13/1436; G08B 21/0469; G08B 21/22; G08B 25/008; Y02B 20/40; F21W 2131/1005
See application file for complete search history.

(56) References Cited

U.S. PATENT DOCUMENTS

| | | | |
|---|---|---|---|
| 6,079,862 A | 6/2000 | Kawashima et al. | |
| 6,474,844 B1 | 11/2002 | Ching | |
| 9,328,882 B2 * | 5/2016 | Spiro | ................... H01R 25/142 |

(Continued)

FOREIGN PATENT DOCUMENTS

EP     3 410 413 A1     12/2018

OTHER PUBLICATIONS

New Milwaukee Power Tools coming in 2019, https://www.youtube.com/watch?v=qZskk_qu2oQ&feature=youtu.be, accessed and available as of Apr. 6, 2020.

*Primary Examiner* — Haissa Philogene
(74) *Attorney, Agent, or Firm* — Maginot, Moore & Beck LLP (57) ABSTRACT

A portable work light is disclosed that provides jobsite lighting and also operate as a security camera for the jobsite. The portable work light comprises a light fixture having one or more rotational degrees of freedom that can be actuated to adjust an orientation of the light fixture. The portable work light advantageously further comprises a camera 14, which provides security features for the jobsite during non-working hours and enables automatic adjustment of the light fixture to maintain optimal illumination of the jobsite during working hours. In this way, security at the jobsite, particularly during non-working hours, can be greatly improved using jobsite equipment that is also useful for other purposes.

20 Claims, 4 Drawing Sheets

(51) Int. Cl.
*H05B 47/19* (2020.01)
*F21W 131/10* (2006.01)

(56) References Cited

U.S. PATENT DOCUMENTS

| | | | | |
|---|---|---|---|---|
| 9,464,767 | B2* | 10/2016 | Whitfield | F21V 5/04 |
| 9,640,055 | B2 | 5/2017 | Fadell et al. | |
| 9,734,697 | B1* | 8/2017 | Modi | G08B 25/008 |
| 9,945,574 | B1* | 4/2018 | Sloo | F24F 11/30 |
| 9,972,195 | B2* | 5/2018 | Simon | G08B 29/188 |
| 10,039,170 | B2* | 7/2018 | Baaijens | A23B 4/00 |
| 10,062,258 | B2 | 8/2018 | Siminoff et al. | |
| 10,263,802 | B2* | 4/2019 | Burns | H04L 12/282 |
| 10,389,982 | B1* | 8/2019 | Fu | G08B 13/1481 |
| 10,485,068 | B2* | 11/2019 | Chemel | H05B 47/155 |
| 10,935,222 | B1* | 3/2021 | Laliberte | F21V 23/0485 |
| 11,014,794 | B2* | 5/2021 | Jones | B66F 17/006 |
| 2018/0198755 | A1 | 7/2018 | Domangue et al. | |
| 2019/0092225 | A1 | 3/2019 | Schermerhorn et al. | |
| 2019/0120469 | A1 | 4/2019 | Windom et al. | |
| 2021/0247059 | A1* | 8/2021 | Johnson | F21V 23/003 |

* cited by examiner

WORK LIGHT HAVING JOBSITE SECURITY FEATURES

FIELD

The device and method disclosed in this document relates to lighting and, more particularly, to a work light having jobsite security features.

BACKGROUND

Unless otherwise indicated herein, the materials described in this section are not prior art to the claims in this application and are not admitted to the prior art by inclusion in this section.

Jobsites, such as indoor and outdoor construction sites or the like, often experience security issues, such as theft of tools and materials or vandalism. Security is a particular challenge for a jobsite because jobsites generally are not staffed around the clock and frequently lack the physical security (e.g., lockable doors and windows) of a typical finished building. Conventional security solutions generally involve security cameras, door and window sensors, alarm sirens, and the like, which are rigidly installed throughout a building. However, such installations are relatively complex and generally permanent, such that they are impractical for temporary usage during a construction project at a jobsite. Accordingly, what is needed is a security solution for jobsites that can be flexibly utilized on a temporary basis and brought from one jobsite to the next. It would also be beneficial to provide a security solution that incorporates non-security features that are otherwise useful in a jobsite environment.

SUMMARY

A work light for providing lighting in an environment is disclosed. The work light comprises a light fixture having a light. The light fixture is configured to direct lighting from the light in a first direction. The work light further comprises a mount configured to support the light fixture. The mount has at least one actuator configured to adjust an orientation of the light fixture so as to adjust the first direction in which the lighting is directed. The work light further comprises a camera configured to capture images of the environment. The work light further comprises a controller operably connected to the light, to the at least one actuator, and to the camera. The controller is configured to, in an armed mode, (i) detect a first person entering into the environment based on the captured images and (ii) activate an alarm state in response to detecting the first person entering into the environment. The controller is configured to, in a tracking mode, (i) determine the location of a second person in the environment based on the captured images and (ii) operate the at least one actuator to adjust the orientation of the light fixture based on the location of the second person. The work light further comprises a battery that is operably connected to and provides operating power to (i) the light, (ii) the at least one actuator, (iii) the camera, and (iv) the controller.

A further work light for providing lighting in an environment is disclosed. The work light comprises a light fixture having a light. The light fixture is configured to direct lighting from the light in a first direction. The work light further comprises a camera configured to capture images of the environment. The work light further comprises a controller operably connected to the light and to the camera. The controller is configured to, in an armed mode, (i) detect a person entering into the environment based on the captured images, (ii) determine whether the person is authorized, and (iii) activate an alarm in response to determining that the person is not authorized. The work light further comprises a battery that is operably connected to and provides operating power to (i) the light, (ii) the camera, and (iii) the controller.

Yet another work light for providing lighting in an environment is disclosed. The work light comprises a light fixture having a light. The light fixture is configured to direct lighting from the light in a first direction. The work light further comprises a camera configured to capture images of the environment. The work light further comprises a controller operably connected to the light and to the camera. The controller is configured to (i) detect a fire in the environment based on the captured images and (ii) activate a further alarm state in response to detecting the fire in the environment. The work light further comprises a battery that is operably connected to and provides operating power to (i) the light, (ii) the camera, and (iii) the controller.

BRIEF DESCRIPTION OF THE DRAWINGS

The foregoing aspects and other features of the portable work light are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Portable Work Lighting System Having Security Features

Figure 1:
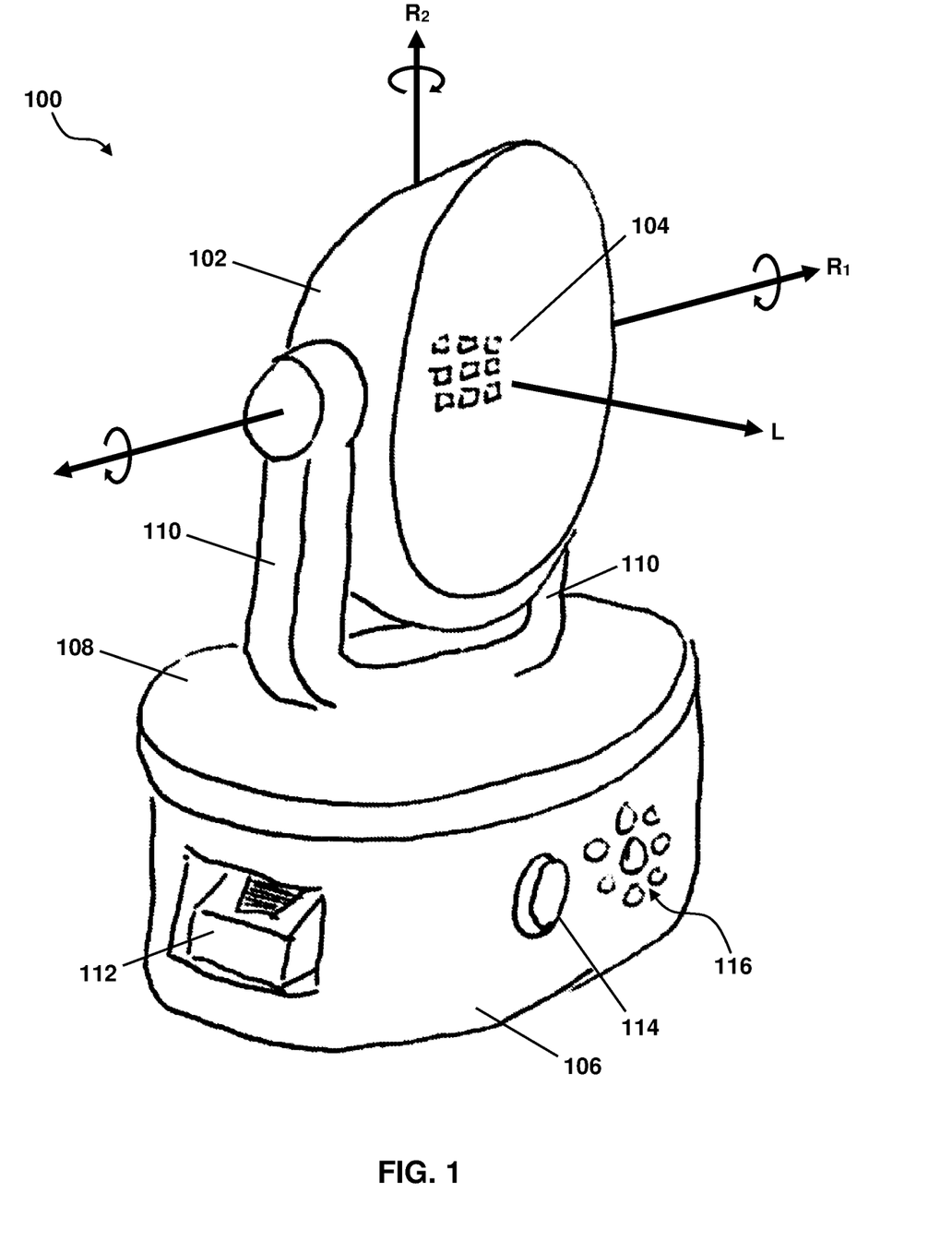
FIG. 1 shows a perspective view of a portable work light.
Figure 2:
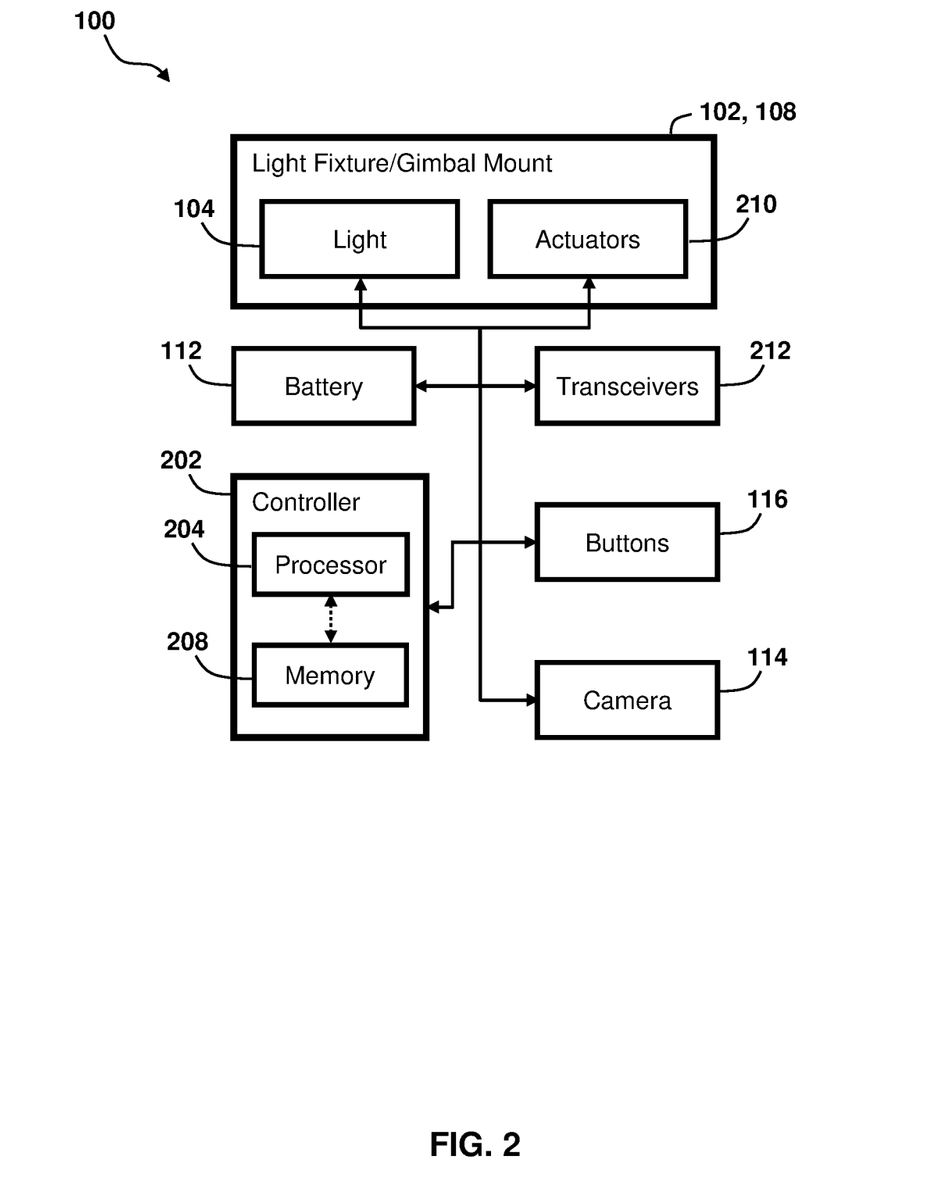
FIG. 2 shows a schematic diagram of the portable work light of FIG. 1.

FIGS. 1-2 show a portable work light 100 that provides jobsite lighting and also operate as a security camera for the jobsite. Particularly, it will be appreciated that jobsites often utilize temporary lighting in the form of work lights, which are brought to the jobsite until a job is completed and then moved to a next jobsite. To this end, the portable work light 100 comprises a light fixture 102 having one or more rotational degrees of freedom that can be actuated to adjust an orientation of the light fixture 102. The portable work light 100 advantageously further comprises a camera 114, which provides security features for the jobsite during non-working hours and, in some embodiments, enables automatic adjustment of the light fixture 102 to maintain optimal illumination of the jobsite during working hours. In this way, security at the jobsite, particularly during non-working hours, can be greatly improved using jobsite equipment that is already used on a regular basis.

With reference to FIG. 1, an exemplary embodiment of the portable work light 100 is shown. The portable work light 100 comprises the light fixture 102, a base portion 106, and a gimbal mount 108. The light fixture 102 is configured to hold the light 104, which may comprise one or more LEDs, incandescent light bulbs, CFL light bulbs, or the like. The light fixture 102 has a shape configured to direct lighting provided by the light 104 in a lighting direction L. As used herein, the "lighting direction" refers to a direction extending from the light fixture 102 in which the lighting provided by the light 104 has a peak intensity. It will be appreciated, however, that the light 104 may nevertheless provide some amount of ambient light in other directions other than the lighting direction L. Moreover, it will be appreciated that the light fixture 102 may be configured to direct lighting in more than one lighting direction L.

The light fixture 102 is supported by a gimbal mount 108 which is attached to the base portion 106 and is configured to enable the light fixture 102 to rotate about one or more rotational degrees of freedom so as to adjust the lighting direction L. The gimbal mount 108 advantageously incorporates one or more actuators (shown in FIG. 2), such as electric motors or the like, that enable the light fixture 102 to be rotated about the one or more rotational degrees of freedom without manual intervention. In at least one embodiment, the gimbal mount 108 is configured to enable the light fixture 102 to rotate about at least two rotational degrees of freedom. In some embodiments, the gimbal mount 108 may be configured to provide one or more translational degrees of freedom, as well.

In the illustrated exemplary embodiment, the gimbal mount 108 includes arms 110 that support the light fixture 102. The light fixture 102 is rotatably attached to the arms 110 such that the light fixture 102 can be rotated about a first rotational axis $R_1$. Additionally, the gimbal mount 108 is rotatably attached to the base portion 106 such that the gimbal mount 108, as well as the light fixture 102, can be rotated about a second rotational axis $R_2$. The incorporated actuators of the gimbal mount 108 are suitably installed and configured to enable rotation of the light fixture 102 about the first rotational axis $R_1$ and about the second rotational axis $R_2$. As a result, the gimbal mount 108 enables reorientation of the light fixture 102 such that lighting provided by the light 104 can be directed in any desired lighting direction L. It will be appreciated, however, that the illustrated embodiment is merely exemplary and that any suitable alternative structures can be utilized to enable to light fixture 102 to be rotatable about one or more rotational degrees of freedom. Moreover, in some embodiments, non-gimbal mounts such as ball and socket type mounts may also be utilized.

The base portion 106 is in the form of a housing that holds a battery 112, a controller (shown in FIG. 2), and any other electronic components discussed herein. In at least one embodiment, the base portion 106 has a substantially flat bottom surface to enable the portable work light 100 to rest on a surface such as a floor or a workbench in a stable manner. In one embodiment, the bottom surface of the base portion 106 includes three or more elastomeric feet or equivalent to provide stability and grip. Additionally, in at least one embodiment, the base portion 106 includes threaded holes (not shown) configured for attachment to a tripod stand or support pole.

As noted above, the portable work light 100 further includes at least one camera 114 configured to enable additional various additional features of the portable work light 100, including security features for the jobsite during non-working hours and, in some embodiments, automatic adjustment of the light fixture 102 to maintain optimal illumination of the jobsite during working hours. In the illustrated embodiment, the camera 114 is installed on an outer surface of the base portion 106. In other embodiments, the camera 114 may be integrated with the light fixture 102, such that the camera 114 is always facing in the lighting direction L.

In some embodiments, the portable work light 100 includes at least one user interface configured to receive inputs from an operator. Particularly, in the illustrated embodiment, the portable work light 100 includes a plurality of buttons 116. The plurality of buttons 116 may, for example, include a button for turning the portable work light 100 on and off, a button for turning the light 104 on and off, buttons for adjusting a brightness of the light 104, buttons for manually adjusting an orientation of the light fixture 102, and/or buttons for manually adjusting a lighting offset (discussed in greater detail below). The portable work light 100 may further include additional or alternative user interfaces, such as switches, display screens, speakers, or the like.

With reference to FIG. 2, exemplary electronic components of the portable work light 100 are shown. As mentioned above, the portable work light 100 includes a controller 202. The controller 202 comprises at least one processor 204 and associated memory 208. The memory 208 is configured to store program instructions that, when executed by the processor 204, enable the controller 202 to perform various operations described elsewhere herein, at least including providing security features for the jobsite using the camera 114. The memory 208 may be of any type of device capable of storing information accessible by the processor 204, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 204 may include a system with a central processing unit, graphics processing units, multiple processing units, dedicated circuitry for achieving functionality, programmable logic, or other processing systems.

The controller 202 is operably connected to actuators 210 and is configured to operate the actuators 210 to adjust the orientation of the light fixture 102 as needed to maintain optimal illumination of the jobsite. For example, with respect to the embodiment illustrated in FIG. 1, the controller 202 operates the actuators 210 to rotate the light fixture 102 about the first rotational axis $R_1$ and about the second rotational axis $R_2$. As noted above, the actuators 210 may comprise electric motors configured to rotate the light fixture 102 about the one or more degrees of freedom enabled by the gimbal mount 108. Accordingly, the electronic components of the portable work light 100 may include additional intermediate motor control or drive circuits (not shown) configured in a suitable manner for driving the electric motors.

The controller 202 is operably connected to the camera 114 and configured to receive a plurality of images from the camera 114. Particularly, the camera 114 is configured to capture a plurality of images of the jobsite environment. Each image captured by the camera 114 may, for example, comprise a two-dimensional array of pixels. Each pixel has corresponding photometric information (e.g., intensity, color, and/or brightness). The photometric information may include red-green-blue (RBG) channel data and/or infrared (IR) channel data. In some embodiments, the camera 114 is configured to generate RGB-D images in which each pixel has corresponding photometric information and geometric information (e.g., depth and/or distance). In such embodiments, the camera 114 may, for example, take the form of two RGB cameras configured to capture stereoscopic images from which depth and/or distance information can be derived, and/or an RGB camera with an associated IR camera from which depth and/or distance information can be derived.

In at least some embodiments, the portable work light 100 further includes one or more radio transceivers 212 configured to communicate with a portable electronic device (e.g., a smartphone or the like) in the possession of an operator, as well as in some cases a remote server (e.g., a cloud service) for the purpose of providing additional services. The radio transceiver(s) 212 may include a Bluetooth® configured to communicate locally with a smartphone or other portable electronic device in the possession of the operator Additionally, the radio transceivers(s) 212 may include transceivers configured to communicate with the Internet via a local network, such as a Wi-Fi transceiver, or transceivers configured to communicate with the Internet via wireless telephony network, such as Global System for Mobiles ("GSM") or Code Division Multiple Access ("CDMA") transceivers.

The controller 202 is operably connected to the plurality of buttons 116 or other user interfaces and configured to receive inputs from an operator via the plurality of buttons 116 or other user interfaces. In some embodiments, the controller 202 is configured to operate the actuators 210 to reorient the light fixture 102 in specified manner based on the inputs received the plurality of buttons 116 or other user interfaces. In some embodiments, the controller 202 is configured to control an on/off state of the light 104 based on the inputs received the plurality of buttons 116 or other user interfaces. In some embodiments, the controller 202 is configured to control a brightness of the light 104 based on the inputs received the plurality of buttons 116 or other user interfaces.

The battery 112 is operably connected to and configured to power the various components of the portable work light 100, at least including the light 104, the actuator(s) 210, the camera 114, the transceivers 212, and the controller 202. In one embodiment, the battery 112 is a rechargeable battery configured to be charged when the portable work light 100 is connected to an external power source. While connected to external power, the various components of the portable work light 100 are powered by the external power source.

Security Features for the Jobsite Environment

In addition to providing work lighting, the portable work light 100 is advantageously configured to provide security features for the jobsite. Particularly, after hours at the jobsite, the portable work light 100 can be switched to an armed mode in which the portable work light 100 operates as a security camera for the jobsite and can detect unauthorized persons at the jobsite and initiate responsive actions in an alarm state. Additionally, in the armed mode, the portable work light 100 can operate to detect other undesirable conditions such as a fire.

Figure 3:
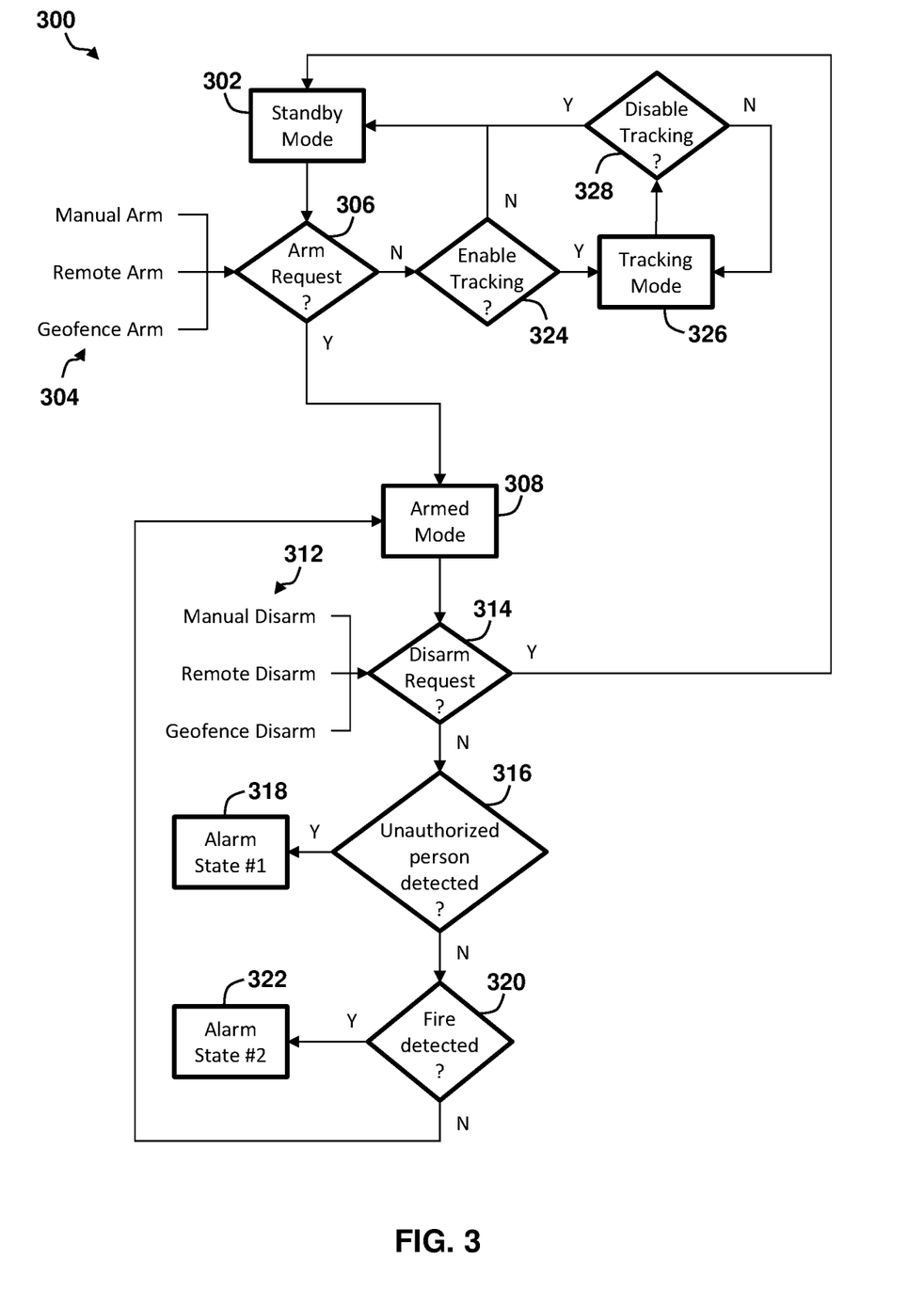
FIG. 3 shows a flow diagram illustrating the operate modes and state changes of the portable work light.

FIG. 3 shows a flow diagram 300 illustrating the operate modes and state changes of the portable work light 100. Particularly, the portable work light 100 has operating modes at least including an armed mode in which the portable work light 100 operates as a security camera and a standby mode in which the portable work light 100 provides illumination of the jobsite but does not operate as a security camera. Additionally, in the armed mode, the portable work light 100 may activate one or more alarm states depending on detected conditions at the jobsite.

Starting from a standby mode (block 302), the portable work light 100 may receive an arm request 304. In response to receiving the arm request 304, the portable work light 100 is switched from the standby mode to the armed mode (block 306, 'Y' path). Otherwise, if an arm request 304 is not received, the portable work light 100 remains in the standby mode (block 306, 'N' path). Similarly, while in the armed mode (block 308), the portable work light 100 may receive a disarm request 312. In response to receiving the disarm request 312, the portable work light 100 is switched from the armed mode to the standby mode (block 314, 'Y' path). Otherwise, if a disarm request 312 is not received, the portable work light 100 remains in the armed mode (block 314, 'N' path). The arm requests 304 and disarm requests 312 can be received by the controller 202 in a variety of different ways.

In one embodiment, the arm requests 304 and disarm requests 312 can be provided as manual inputs via the buttons 116 or other user interface. In response to receiving an input via the buttons 116 or other user interface indicating an arm request 304 (i.e., selecting the armed mode), the controller 202 is configured to switch the portable work light 100 to the armed mode. Likewise, in response to receiving an input via the buttons 116 or other user interface indicating a disarm request 312 (i.e., selecting the standby mode or other mode), the controller 202 is configured to switch the portable work light 100 to the standby mode or other mode.

In another embodiment, the arm requests 304 and disarm requests 312 can be provided remotely in the form of an operating mode selection message which indicates a selected operating mode and is received via the transceivers 212 from a portable electronic device (e.g., a smartphone) in the possession of an authorized user. In response to receiving an operating mode selection message indicating an arm request 304 (i.e., selecting the armed mode), the controller 202 is configured to switch the portable work light 100 to the armed mode. Likewise, in response to receiving an operating mode selection message indicating a disarm request 312 (i.e., selecting the standby mode or other mode), the controller 202 is configured to switch the portable work light 100 to the standby mode or other mode.

In a further embodiment, the arm requests 304 and disarm requests 312 can be received in the form of geo-fence entry message or a geo-fence exit message that is received via the transceivers 212 from a portable electronic device (e.g., a smartphone) in the possession of an authorized user. Particularly, in this case the portable electronic device self-localizes (e.g., using GPS) to determine whether it is inside or outside a defined geographical boundary around the portable work light 100. The portable electronic device transmits geo-fence entry message to the portable work light 100 in response to the portable electronic device entering the defined geographical boundary. Likewise, the portable electronic device transmits geo-fence exit message to the portable work light 100 in response to the portable electronic device exiting the defined geographical boundary. In response to receiving a geo-fence entry message, the controller 202 is configured to switch the portable work light 100 to the standby mode. Likewise, in response to receiving a geo-fence exit message, the controller 202 is configured to switch the portable work light 100 to the armed mode. In one embodiment, the controller 202 is configured to switch the portable work light 100 to the armed mode only after receiving geo-fence exit messages from portable electronic devices in the possession of all authorized users.

With continued reference to FIG. 3, while in the armed mode, the portable work light 100 monitors the jobsite environment for unauthorized persons. If an unauthorized person is detected in the jobsite environment, a first alarm state (block 318) is activated in which one or more responsive actions are taken (block 316, 'Y' path). Otherwise, if no unauthorized persons are detected in the jobsite environment, then the portable work light 100 does not activate the first alarm state (block 316, 'N' path).

Particularly, in the armed mode, the controller 202 is configured to operate the camera 114 to continuously or periodically capture images or video of the jobsite environment. The controller 202 processes the captured images or video to detect if and when a person enters the jobsite environment. In some embodiments, the controller 202 is configured to activate a first alarm state in response to any person entering the jobsite environment. Alternatively, in at least one embodiment, when a person enters the jobsite environment, the controller 202 is configured to determine an identity of the detected person based on the captured images or video, using facial recognition techniques. If the identity of the detected person does not correspond to a known and authorized person, then the controller 202 is configured to activate the first alarm state. Otherwise, if the identity of the detected person corresponds to a known and authorized person, then the controller 202 does not activate any alarm state. In one embodiment, if the identity of the detected person corresponds to a known and authorized person, the controller 202 is configured to switch the portable work light 100 to the standby mode.

In the first alarm state (block 318), various responsive actions may be taken locally. In one embodiment, in response to the first alarm state being activated, the controller 202 is configured to operate the light 104 to turn on. In one embodiment, in response to the first alarm state being activated, the controller 202 is configured to operate a speaker of the portable work light 100 to play a pre-recorded audio message or an alarm siren sound. In one embodiment, in response to the first alarm state being activated, the controller 202 is configured to operate the camera 114 to capture an image or video of the detected person in the jobsite environment.

In at least one embodiment, the controller 202 is configured to detect whether the detected person is facing the portable work light 100 based on the captured images or video and delay activating the first alarm state, or delay initiating some or all of the responsive actions of the first alarm state, until the detected person faces the portable work light 100. Particularly, in one embodiment, when a person is detected entering the jobsite environment, the controller 202 is configured to delay certain responsive actions that might scare away the detected person (e.g. turning the light 104 on or playing sounds from a speaker). Instead, the controller 202 is configured to monitor whether the detected person is facing the portable work light 100. In response to the detected person facing the portable work light 100, the controller 202 is configured to capture an image of the detected person's face, as well as initiate any other responsive actions of the first alarm state. In this way, the detected unauthorized person will not be scared away until an image of his or her face can be captured by the camera 114.

In the first alarm state (block 318), various additional responsive actions may be taken to notify a user or third-party of the unauthorized entry. In some embodiments, in response to the first alarm state being activated, the controller 202 is configured to operate the transceivers 212 to send a notification message to a portable electronic device in the possession of an authorized user or to a law enforcement entity. The notification message may take the form of an email, a text message, or a push notification that is presented by an application on the portable electronic device. In one embodiment, the notification message includes an image or video that was captured by the camera 114 in response to detecting the unauthorized person in the jobsite environment. In one embodiment, the controller 202 is configured to operate the transceivers 212, as well as the camera 114, a speaker, and/or a microphone, to provide two-way audio communication between the authorized user of the portable electronic device and the jobsite environment. In one embodiment, the controller 202 is configured to operate the transceivers 212 and the camera 114 to provide a live video stream of the jobsite environment to the authorized user of the portable electronic device.

With continued reference to FIG. 3, while in the armed mode, the portable work light 100 monitors the jobsite environment for a fire or other dangerous conditions. If a fire or other dangerous condition is detected in the jobsite environment, a second alarm state (block 322) is activated in which one or more responsive actions are taken (block 320, 'Y' path). Otherwise, if no fire or other dangerous condition detected in the jobsite environment, then the portable work light 100 does not activate the second alarm state (block 320, 'N' path).

Particularly, in the armed mode, the controller 202 is configured to operate the camera 114 to continuously or periodically capture images or video of the jobsite environment. The controller 202 processes the captured images or video to detect a fire the jobsite environment. The controller 202 may be configured to detect a fire based on RGB images, but also may utilize infrared and/or thermal images if the camera 114 is equipped with infrared and/or thermal image sensors. In one embodiment, the controller 202 is configured to operate the transceivers 212 to transmit captured images or video to a remote image processing server for analysis and detect the fire based on an analysis result received from the remote image processing server.

In the second alarm state (block 322), various responsive actions may be taken. In some embodiments, in response to the second alarm state being activated, the controller 202 is configured to operate the transceivers 212 to send a notification message to a portable electronic device in the possession of an authorized user and/or to a local fire department. The notification message may take the form of an email, a text message, or a push notification that is presented by an application on the portable electronic device.

It should be appreciated that, in at least some embodiments, the fire detection can be separately armed using second armed mode that is distinct from the armed mode discussed above. The second armed mode can be armed and disarmed in the same manner as discussed above. Accordingly, the portable work light 100 can be armed to detect fires at the jobsite during working hours, not only after-hours when it also armed to detect intruders. Moreover, in some embodiments, the fire detection is not armed or disarmed at all, and will detect fires in any operating mode. In some embodiments a frequency of the at which the controller 202 checks for a fire in the captured images depends on the operating mode. For example, in one embodiment, the controller checks for a fire more frequently during work-hours when the portable work light 100 is not armed for intruder detection, and less frequently during after-hours when the portable work light 100 is armed for intruder detection In addition to the two alarm states described above, the portable work light 100 may provide additional security and safety feature in the armed mode or in other modes. Particularly, in some embodiments, during work hours, the controller 202 is configured to processor images or videos captured by the camera 114 to detect unsafe working conditions. For example, in one embodiment, based on the images or videos captured by the camera 114, the controller 202 is configured to detect if work is being performed in an unsafe manner, such as without proper safety equipment being worn (e.g., helmets, masks, gloves, etc.).

Human Tracking to Maintain Optimal Lighting in the Jobsite Environment

In at least one embodiment, the portable work light 100 is advantageously configured to, in a tracking mode, track a target person's location within the jobsite environment and automatically reorient the light fixture 102 as needed to maintain optimal illumination of the jobsite for the target person. It will be appreciated that, conventionally, work lights are statically placed in the jobsite environment and require periodic user interaction (i.e., movement or reorientation of the lights) to provide continued optimal illumination of the jobsite. The time required to reposition or reorient a work light is non-value-added work. In other words, this is work that is required to get a job done but does not add value to the finished product. Thus, by automatically reorienting the light fixture 102, the non-value-added work of repositioning or reorienting the work light is eliminated, thus enhancing the productivity of the target person at the jobsite.

With continued reference to FIG. 3, while in the standby mode (block 302), the portable work light 100 may receive a tracking enable request. In response to receiving the tracking enable request, the portable work light 100 is switched from the standby mode to the tracking mode (block 324, 'Y' path). Otherwise, if a tracking enable request is not received, the portable work light 100 remains in the standby mode (block 324, 'N' path). Similarly, while in the tracking mode (block 326), the portable work light 100 may receive a tracking disable request. In response to receiving the tracking disable request, the portable work light 100 is switched from the tracking mode to the standby mode (block 328, 'Y' path). Otherwise, if a tracking disable request is not received, the portable work light 100 remains in the tracking mode (block 328, 'N' path).

The tracking enable requests and tracking disable requests can be received by the controller 202 in a variety of different ways, similar to the arm requests 304 and the disarm request 312. Particularly, the tracking enable requests and tracking disable requests can be provided as manual inputs via the buttons 116 or other user interface. Additionally, the tracking enable requests and tracking disable requests can be provided remotely in the form of an operating mode selection message which indicates a selected operating mode and is received via the transceivers 212 from a portable electronic device (e.g., a smartphone) in the possession of an authorized user. In response to receiving tracking enable request, the controller 202 is configured to switch the portable work light 100 to the tracking mode. Likewise, in response to receiving tracking disable request, the controller 202 is configured to switch the portable work light 100 to the standby mode.

The portable work light 100 utilizes a vision-based tracking technique for tacking the target person, which advantageously leverages the camera 114 that already enables the security features described above. Particularly, based on a plurality of images captured by the camera 114, the controller 202 is configured to determine, on a continuous basis, the location of a target person in the jobsite environment. The location of the target person may be determined in absolute terms or in terms relative to the location of the portable work light 100.

Figure 4A:
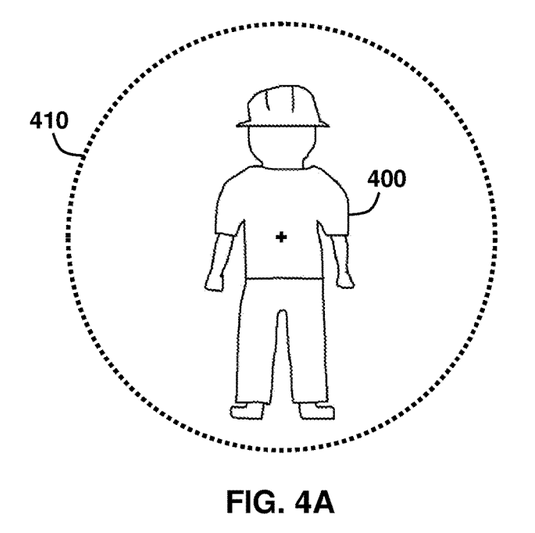
FIGS. 4A-4C illustrate exemplary techniques for maintaining optimal illumination of the jobsite for a target person.
Figure 4B:
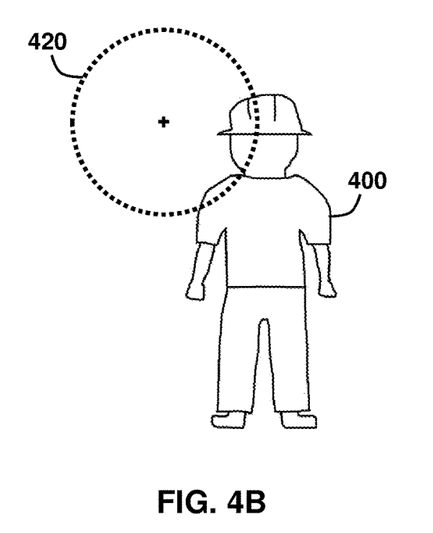
Figure 4C:
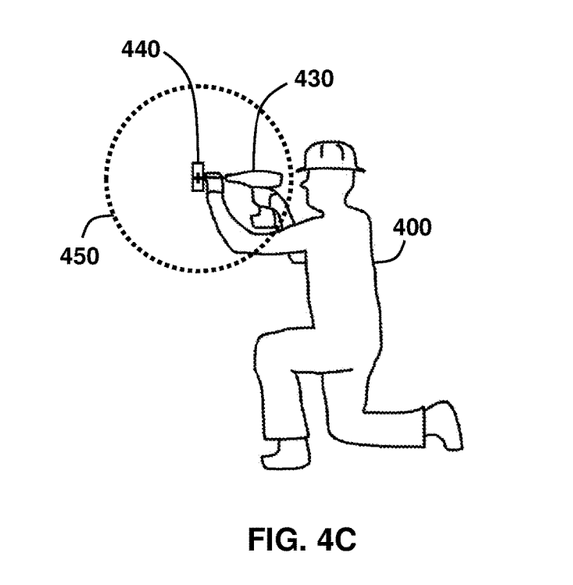

Based on the location of the target person in the jobsite environment, the portable work light 100 automatically reorients the light fixture 102 as necessary to maintain optimal illumination of the jobsite for the target person. Particularly, the controller 202 is configured to operate the actuators 210 to adjust the orientation of the light fixture 102 based on the continuously determined location of the target person. In this way, the non-value-added work of repositioning or reorienting the portable work light 100 is eliminated, thus enhancing the productivity of the target person at the jobsite. FIGS. 4A-4C illustrate exemplary techniques for maintaining optimal illumination of the jobsite for the target person.

FIG. 4A shows a lighting technique in which the light fixture 102 is continuously adjusted to direct the lighting provided by the light 104 toward the determined location of the target person 400, which may correspond in particular to an estimated center of mass/volume of the target person. Thus, the portable work light 100 provides a lighted region 410 around the target person 400. In this way, as the target person 400 moves throughout the jobsite environment, the portable work light 100 continuously provides optimal lighting as the target person 400 to performs tasks in at jobsite, without the need for manually repositioning or reorienting the portable work light 100.

To this end, in at least one embodiment, the controller 202 is configured to operate the actuators 210 to adjust the orientation of the light fixture 102 such that the lighting direction L points toward the location of the target person 400. As the target person 400 moves throughout the jobsite environment, the controller 202 continuously determines an updated location of the target person 400 and operates the actuators 210 to adjust the orientation of the light fixture 102 to maintain lighting directed toward the updated location of the target person 400.

FIG. 4B shows a lighting technique in which the light fixture 102 is continuously adjusted to direct the lighting provided by the light 104 toward an offset location. The offset location is offset from the determined location of the target person 400 in a predetermined and adjustable manner. In the illustrated example, the lighting is directed so as to provide an offset lighted region 420 at an offset location located above the left shoulder of the target person 400. This may be useful, for example, if the target person intends to hammer a large number of nails into a wall and needs lighting above his or her left should in particular to best perform this task. In this way, as the target person 400 moves along the wall to hammer the large number of nails, the portable work light 100 continuously provides optimal lighting for the task, without the need for manual repositioning or reorienting the portable work light 100.

The particular manner in which the offset lighted region 420 is offset with respect to the continuously determined location of the target person is adjustable by the target person 400 or by another operator. Particularly, in the illustrated example, the offset lighted region 420 is located up and to the left relative to the determined location of the target person 400. However, any other directional offset can be utilized to provide optimal lighting for whatever task is being performed by the target person 400. In one embodiment, the offset is adjusted manually by pressing the buttons 116 of the portable work light 100. In another embodiment, the offset is adjusted via an application that runs on a portable electronic device (e.g., a smartphone or the like) carried by the target person or other operator.

To this end, in at least one embodiment, the controller 202 is configured to receive inputs from the buttons 116 or a message from the portable electronic device indicating a desired offset value that has been selected by the target person 400 or other operator. The desired offset value may, for example, take the form of a direction, distance, and/or vector that defines an offset location relative to the determined location of the target person 400. Once the desired offset value is selected and received, the controller 202 is configured to operate the actuators 210 to adjust the orientation of the light fixture 102 such that the lighting direction L points toward an offset location that is offset from the determined location of the target person 400 in the manner defined by the desired offset value. As the target person 400 moves throughout the jobsite environment, the controller 202 continuously determines an updated location of the target person 400 and operates the actuators 210 to adjust the orientation of the light fixture 102 to maintain lighting directed toward an offset location that is defined relative to the updated location of the target person 400.

FIG. 4C shows a lighting technique in which the light fixture 102 is continuously adjusted to direct the lighting provided by the light 104 toward an offset location which is automatically determined based on an action being performed by the target person. Particularly, in one embodiment, in addition to tracking the location of the target person, the portable work light 100 determines what the target person 400 is doing. Based on what the target person 400 is doing, the portable work light 100 determines an offset location that is most appropriate. In the illustrated example, the target person 400 is performing a task using a handheld power tool 430 on a workpiece 440. The portable work light 100 detects that the target person is performing such a task and directs the lighting so as to provide an offset lighted region 450 at an offset location that is centered on the workpiece 440 and/or at an interface between the power tool 430 and the workpiece.

To this end, the controller 202 is configured to detect various types of actions or poses that might be performed by the target person 400 based on the images captured by the camera 114. The controller 202 may utilize a wide variety of techniques to detect the various types of actions or poses that might be performed by the target person 400. The controller 202 is configured to use pose detection techniques, facial recognition techniques, object recognition techniques, and other computer-vision techniques to detect the various types of actions or poses that might be performed by the target person 400. Based on the detected action or pose of the target person 400, the controller 202 is configured to automatically determine an optimal offset location for the detected action or pose. The controller 202 operates the actuators 210 to adjust the orientation of the light fixture 102 to maintain lighting directed toward the determined offset location.

In one embodiment, the controller 202 is configured process the images captured by the camera 114 to detect that the target person 400 is perform an action using a tool (e.g., the handheld power tool 430). In response to detecting that the target person 400 is perform an action using a tool, the controller 202 is configured to set the offset location at the location of the tool. Alternatively, the controller 202 is configured to set the offset location at a location depending on the particular type of tool. Particularly, in some embodiments, the controller 202 is configured to identify the type of tool based on the images captured by the camera 114. For some types of tools (e.g., a drill with a short drill bit), the controller 202 sets the offset location as the location of the tool. For other types of tools (e.g., a drill with a very long drill bit), the controller 202 sets the offset location at an interface between the tool and a workpiece and/or surface that is being acted upon by the tool.

In another embodiment, the controller 202 is configured process the images captured by the camera 114 to detect that the target person 400 is performing an action with respect to a workpiece or surface (e.g., the workpiece 440). In response to detecting that the target person 400 is performing an action with respect to a workpiece or surface, the controller 202 is configured to set the offset location at a location of the workpiece or surface.

In another embodiment, the controller 202 is configured to process the images captured by the camera 114 to detect whether target person 400 is facing toward the portable work light 100. In response to detecting that the target person 400 is facing the portable work light 100, the controller 202 is configured to set the offset location at a location away from the face of the target person 400, so as to avoid shining the light directly into the face of the target person 400. In one embodiment, the controller 202 is configured to, in response to detecting that the target person 400 is facing the portable work light 100, set the offset location at a location corresponding to a nearby wall, ceiling, or floor. In this way, the portable work light 100 continues to provide diffuse ambient lighting for the target person 400 without blinding the target person 400.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A work light for providing lighting in an environment, the work light comprising:
   a light fixture having a light, the light fixture configured to direct lighting from the light in a first direction;
   a mount configured to support the light fixture, the mount having at least one actuator configured to adjust an orientation of the light fixture so as to adjust the first direction in which the lighting is directed;
   a camera configured to capture images of the environment;
   a controller operably connected to the light, to the at least one actuator, and to the camera, the controller being configured to:
      in an armed mode, (i) detect a first person entering into the environment based on the captured images and (ii) activate an alarm state in response to detecting the first person entering into the environment; and
      in a tracking mode, (i) determine the location of a second person in the environment based on the captured images and (ii) operate the at least one actuator to adjust the orientation of the light fixture based on the location of the second person; and
   a battery that is operably connected to and provides operating power to (i) the light, (ii) the at least one actuator, (iii) the camera, and (iv) the controller.

2. The work light of claim 1 further comprising:
   a user interface configured to receive inputs from an operator of the work light, wherein the controller is configured to at least one of (i) switch into the armed mode in response to a first input received via the user interface, (ii) switch into the tracking mode in response to a second input received via the user interface, and (iii) switch into a standby mode in response to a third input received via the user interface.

3. The work light of claim 1 further comprising:
a transceiver configured to communicate with a portable electronic device, the controller being configured to operate the transceiver to receive a message from the portable electronic device indicating a selected operating mode,
wherein the controller is configured to at least one of (i) switch into the armed mode in response to the message indicating a selection of the armed mode, (ii) switch into the tracking mode in response to the message indicating a selection of the tracking mode, and (iii) switch into a standby mode in response to the message indicating a selection of the standby mode.

4. The work light of claim 1, wherein the controller is configured to at least one of (i) switch into the armed mode in response to a portable electronic device entering a defined geographical boundary around the work light and (ii) switch out of the armed mode in response to the portable electronic device exiting the defined geographical boundary around the work light.

5. The work light of claim 1, wherein the controller is configured to, in the armed mode, (i) determine an identity of the first person using facial recognition based on the captured images, and (ii) activate the alarm state in only if the identity of the first person does not correspond to an authorized person.

6. The work light of claim 1, wherein the controller is configured to switch out of the armed mode in response to the identity of the first person corresponding to an authorized person.

7. The work light of claim 1, wherein the controller is configured to, in the armed mode, (i) detecting whether the first person is facing the work light based on the captured images, and (ii) activate the alarm state only after the first person faces the work light.

8. The work light of claim 7, wherein the controller is configured to, in the armed mode, operate the camera to capture at least one image of the first person's face in response to the alarm state being activated.

9. The work light of claim 1, wherein the controller is configured to, in the armed mode, turn on the light of the light fixture in response to the alarm state being activated.

10. The work light of claim 1, wherein the controller is configured to, in the armed mode, operate a speaker to play a pre-recorded audio message in response to the alarm state being activated.

11. The work light of claim 1, wherein the controller is configured to, in the armed mode, operate the camera to capture an image or a video of the first person in response to the alarm state being activated.

12. The work light of claim 1 further comprising:
a transceiver configured to communicate with a portable electronic device, the controller being configured to operate the transceiver to transmit a message to the portable electronic device indicating that the alarm state is activated in response to the alarm state being activated.

13. The work light of claim 12, wherein the message includes an image or a video of the first person that was captured by the camera.

14. The work light of claim 12, wherein the controller is configured to operate the transceiver to provide two-way audio communication between a user of the portable electronic device and the first person in the environment.

15. The work light of claim 1, wherein the controller is configured to, in the armed mode, (i) detect a fire in the environment based on the captured images and (ii) activate a further alarm state in response to detecting the fire in the environment.

16. The work light of claim 1, wherein the controller is configured to, in the tracking mode, operate the at least one actuator to adjust the orientation of the light fixture such that the first direction in which the lighting from the light is directed points toward one of (i) the location of the second person and (ii) an offset location which is offset from the location of the second person.

17. The work light of claim 16 further comprising at least one of:
a user interface configured to receive inputs from an operator of the work light, the inputs indicating the offset location; and
a transceiver configured to communicate with a portable electronic device, the controller being configured to operate the transceiver to receive a message from the portable electronic device indicating the offset location.

18. The work light of claim 16, wherein the controller is configured to, in the tracking mode, automatically determine the offset location depending on the captured images.

19. A work light for providing lighting in an environment, the work light comprising:
a light fixture having a light, the light fixture configured to direct lighting from the light in a first direction;
a camera configured to capture images of the environment;
a controller operably connected to the light and to the camera, the controller being configured to, in an armed mode, (i) detect a person entering into the environment based on the captured images, (ii) determine whether the person is authorized, and (iii) activate an alarm in response to determining that the person is not authorized; and
a battery that is operably connected to and provides operating power to (i) the light, (ii) the camera, and (iii) the controller.

20. A work light for providing lighting in an environment, the work light comprising:
a light fixture having a light, the light fixture configured to direct lighting from the light in a first direction;
a camera configured to capture images of the environment;
a controller operably connected to the light and to the camera, the controller being configured to (i) detect a fire in the environment based on the captured images and (ii) activate a further alarm state in response to detecting the fire in the environment; and
a battery that is operably connected to and provides operating power to (i) the light, (ii) the camera, and (iii) the controller.

* * * * *